US009459153B2

(12) United States Patent
Patrick et al.

(10) Patent No.: US 9,459,153 B2
(45) Date of Patent: Oct. 4, 2016

(54) AUTOMATED ANALYTICS SYSTEMS AND METHODS

(71) Applicant: General Electric Company, Schenectady, NY (US)

(72) Inventors: Romano Patrick, Atlanta, GA (US); Sameer Vittal, Atlanta, GA (US); Gary Cristofoli, Atlanta, GA (US); Johan Michael Reimann, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 14/488,873

(22) Filed: Sep. 17, 2014

(65) Prior Publication Data

US 2016/0078673 A1   Mar. 17, 2016

(51) Int. Cl.
*G06T 15/00*   (2011.01)
*G01J 5/00*   (2006.01)

(52) U.S. Cl.
CPC ............ *G01J 5/0088* (2013.01); *G01J 5/0022* (2013.01); *G01J 2005/0077* (2013.01)

(58) Field of Classification Search
CPC ..... G07C 5/008; F01D 9/023; F01D 21/003; F03D 7/028; F03D 11/0091
USPC ................................ 345/419, 420, 582, 619
See application file for complete search history.

(56) References Cited

U.S. PATENT DOCUMENTS

| | | | |
|---|---|---|---|
| 7,571,057 B2 | 8/2009 | D'Amato et al. | |
| 7,769,507 B2 | 8/2010 | Volponi et al. | |
| 7,887,234 B2 | 2/2011 | Jonnalagadda et al. | |
| 7,895,016 B2 * | 2/2011 | Vittal | F03D 11/0091 290/44 |
| 7,946,157 B2 * | 5/2011 | Habets | F03D 7/028 73/112.01 |
| 8,244,025 B2 | 8/2012 | Davis et al. | |
| 8,300,232 B2 | 10/2012 | Sansom et al. | |
| 8,477,154 B2 | 7/2013 | Davis et al. | |
| 8,478,547 B2 | 7/2013 | Hadley et al. | |
| 8,676,436 B2 * | 3/2014 | Raimarckers | F01D 21/003 701/29.5 |
| 8,712,739 B2 * | 4/2014 | Jiang | F01D 21/003 703/2 |
| 8,786,848 B2 * | 7/2014 | Hatcher | F01D 9/023 348/83 |
| 8,843,348 B2 * | 9/2014 | Pascu | G01M 13/028 701/100 |
| 9,003,809 B2 * | 4/2015 | Johnson | F01D 9/023 60/39.182 |
| 9,014,918 B2 * | 4/2015 | Hagen | G07C 5/008 701/117 |
| 2006/0047403 A1 | 3/2006 | Volponi et al. | |

FOREIGN PATENT DOCUMENTS

WO       2008093349 A1    8/2008

* cited by examiner

*Primary Examiner* — Phu K Nguyen
(74) *Attorney, Agent, or Firm* — Sutherland Asbill & Brennan LLP

(57) ABSTRACT

An automated analytics system can include a sensor system that obtains measurement data by monitoring one or more parameters at each of a number of locations on each of a number of replicated components of an object. A computing device receives the measurement data from the sensor system and uses the measurement data to automatically generate a computerized representation of each of the plurality of replicated components. Thereafter, upon receipt of an input query, the computing device generates a synthesized representation of the object that is specifically directed to a parameter of interest indicated in the query. The synthesized representation may be displayed in a visual format that is interpretable by a human to derive information associated with the parameter of interest.

20 Claims, 9 Drawing Sheets

AUTOMATED ANALYTICS SYSTEMS AND METHODS

FIELD OF THE DISCLOSURE

This disclosure generally relates to analytics, and more particularly to automated analytics systems and methods.

BACKGROUND OF THE DISCLOSURE

A moving object is typically subjected to a variety of forces and conditions that may adversely impact the integrity of the moving object. For example, various parts in an engine of a car may heat up when the car is set in motion. Some parts may heat up more than others depending on the way the car is driven and the conditions under which the car is driven. Engineers typically attempt to predict the extent of the heat generation in the various parts of the car under a variety of conditions before making the car available for sale to the general public.

In some cases, the effects of the heating may be readily apparent—either through visual observation of viewable moving parts or by the use of relatively simple test equipment. However, in some other cases, the nature of the heating and the adverse effects of the heating on the performance or longevity of a moving part (such as a piston, for example) may not be readily viewable and/or identifiable.

Consequently, engineers may resort to using a computer simulation procedure to replicate one or more possible scenarios in which a moving part may operate. However, as can be understood, it is difficult and complicated to theoretically predict all possible scenarios of operation for the moving part when executing the computer simulation procedure. Therefore, in some situations, engineers may opt to use a real-world test system in order to evaluate the operation of the part when the part is actually in motion. However, the voluminous amount of data that may be generated by a computer that is a part of this real-world test system makes it often difficult to analyze potential problems that may exist in various individual components that make up the moving part, and/or to identify certain components that may be more susceptible to breakdown or damage than others.

BRIEF DESCRIPTION OF THE DISCLOSURE

Embodiments of the disclosure can address some or all of the needs described above. Embodiments of the disclosure are directed generally to automated analytics systems and methods.

According to one example embodiment of the disclosure, an automated analytics method can include obtaining measurement data by using a sensor system to monitor one or more parameters at a plurality of locations on each of a plurality of replicated components of an object. The method can also include providing to a computing device, the measurement data. The measurement data can be used by the computing device to automatically generate a computerized representation of each of the plurality of replicated components. The method can further include receiving in the computing device, an input query comprising a first parameter of interest. The computing device may respond to the input query by using the computerized representation of each of the plurality of replicated components to generate a synthesized representation of the object, the synthesized representation of the object specifically directed to the first parameter of interest.

According to another example embodiment of the disclosure, an automated analytics system can include a sensor system configured to obtain measurement data by monitoring one or more parameters at a plurality of locations on each of a plurality of replicated components of an object. The system can also include a computing device having an input interface, a processor, and a display. The input interface is configured to receive the measurement data obtained by the sensor system and to also receive a first input query comprising a first parameter of interest. The processor can be configured to use the measurement data to automatically generate a computerized representation of each of the plurality of replicated components, and to respond to the first input query by using the computerized representation of each of the plurality of replicated components to generate a first synthesized representation of the object based on the first parameter of interest. The display can be configured to display the first synthesized representation of the object in a visual format that is interpretable by a human being to derive information associated with the first parameter of interest.

According to yet another example embodiment of the disclosure, a computer-readable storage medium can be provided. The computer-readable storage medium has stored thereon, instructions executable by a computer for performing operations that can include using at least one of measurement data and a set of metrics derived from a simulation, to generate a computerized representation of each of a plurality of replicated components of an object. The computer-readable storage medium can also have stored thereon instructions executable by a computer for performing operations pertaining to responding to a first input query by using the computerized representation of each of the plurality of replicated components to generate a first synthesized representation of the object, the first synthesized representation of the object providing information specifically directed to a first parameter of interest contained in the first input query.

Other embodiments and aspects of the disclosure will become apparent from the following description taken in conjunction with the following drawings.

BRIEF DESCRIPTION OF THE DRAWINGS

Figure 1:
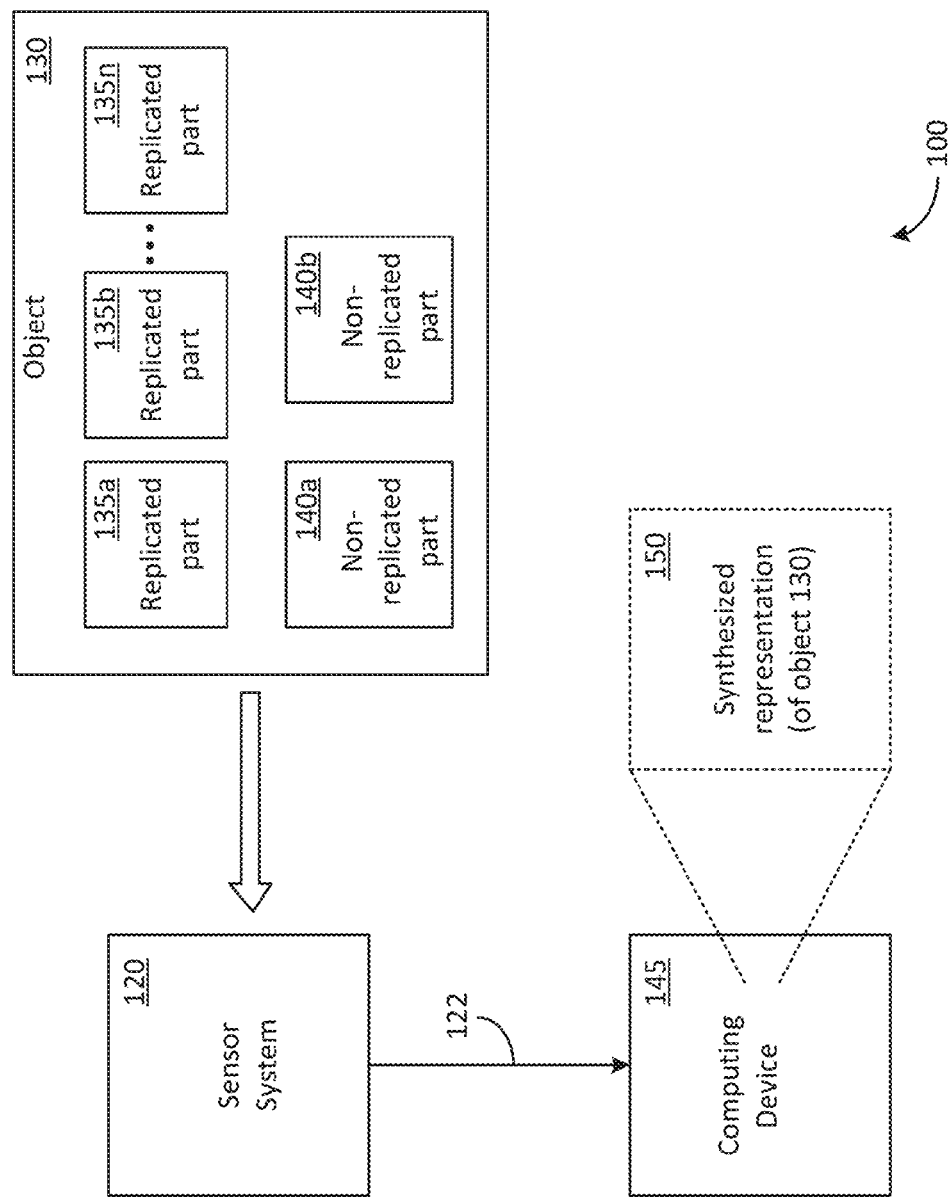

Having thus described the disclosure in general terms, reference will now be made to the accompanying drawings, which are not necessarily drawn to scale, and wherein:

FIG. 1 illustrates an example functional block diagram representing an automated analytics system according to an embodiment of the disclosure.

Figure 2B:
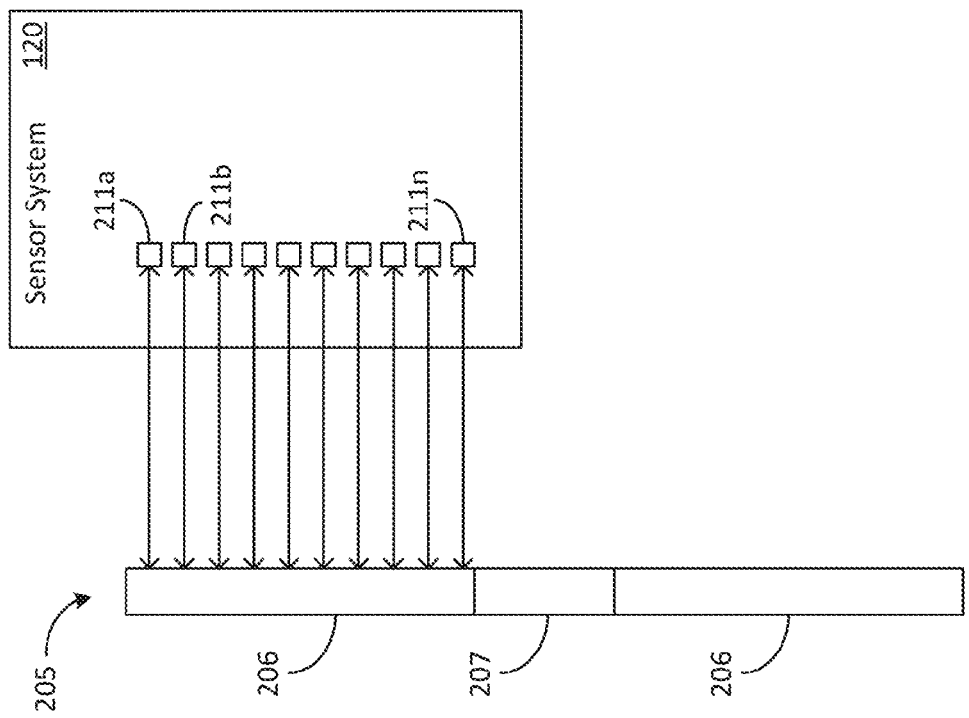
Figure 2A:
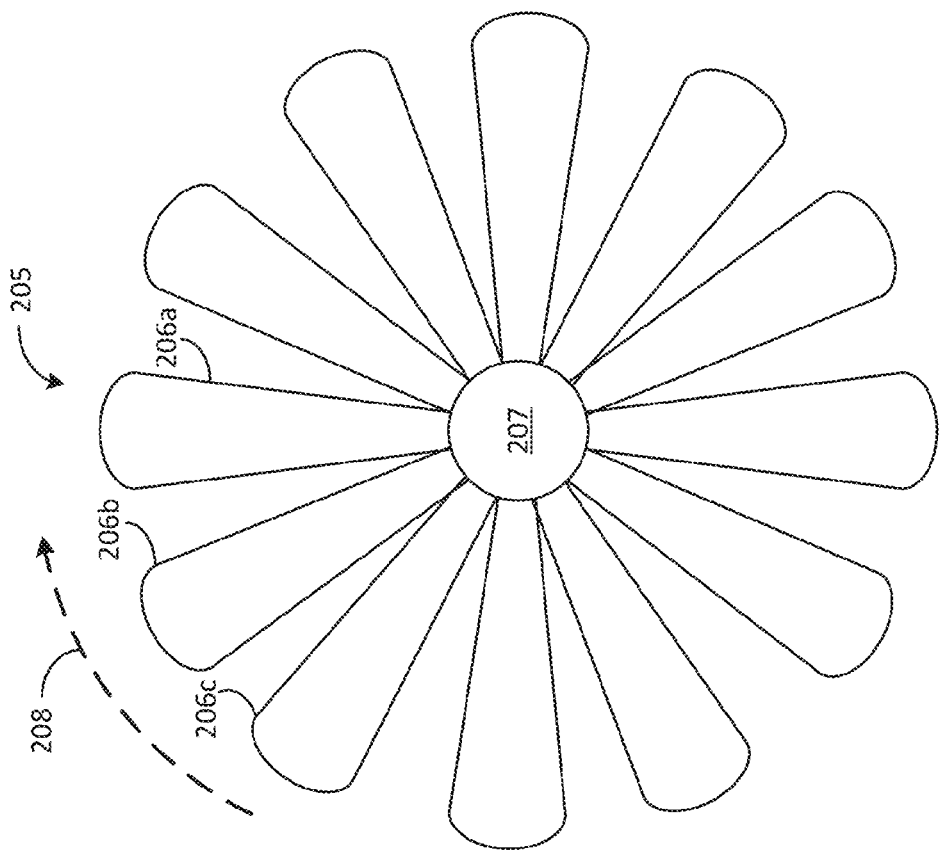

FIGS. 2A and 2B illustrate an example automated analytics system comprising a sensor system coupled to an object in accordance with one embodiment of the disclosure.

Figure 3:
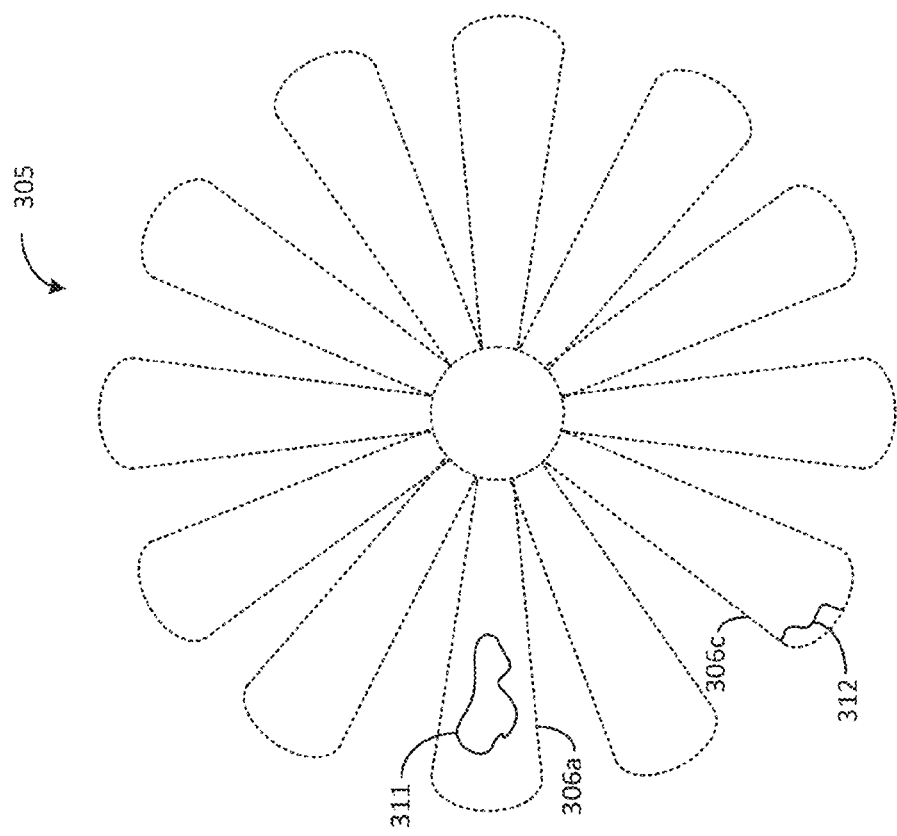
Figure 3:
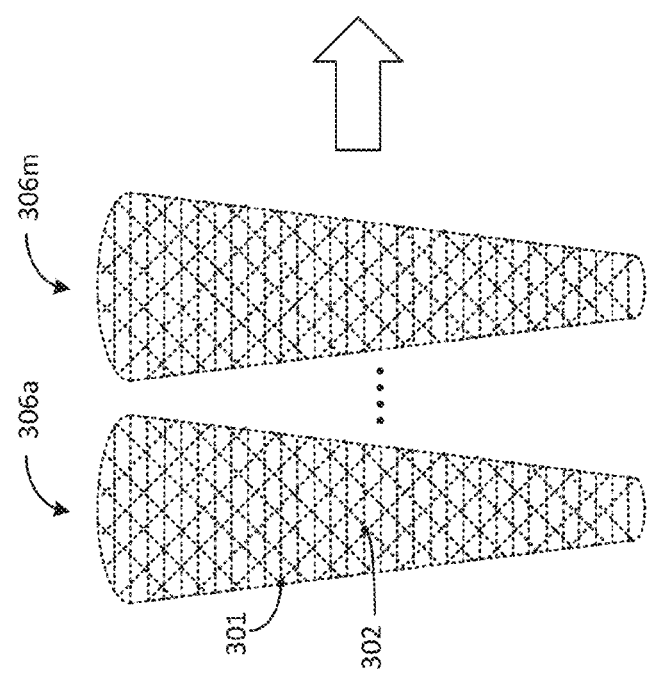

FIG. 3 illustrates an example procedure for generating a synthesized representation of an object in accordance with one embodiment of the disclosure.

Figure 4:
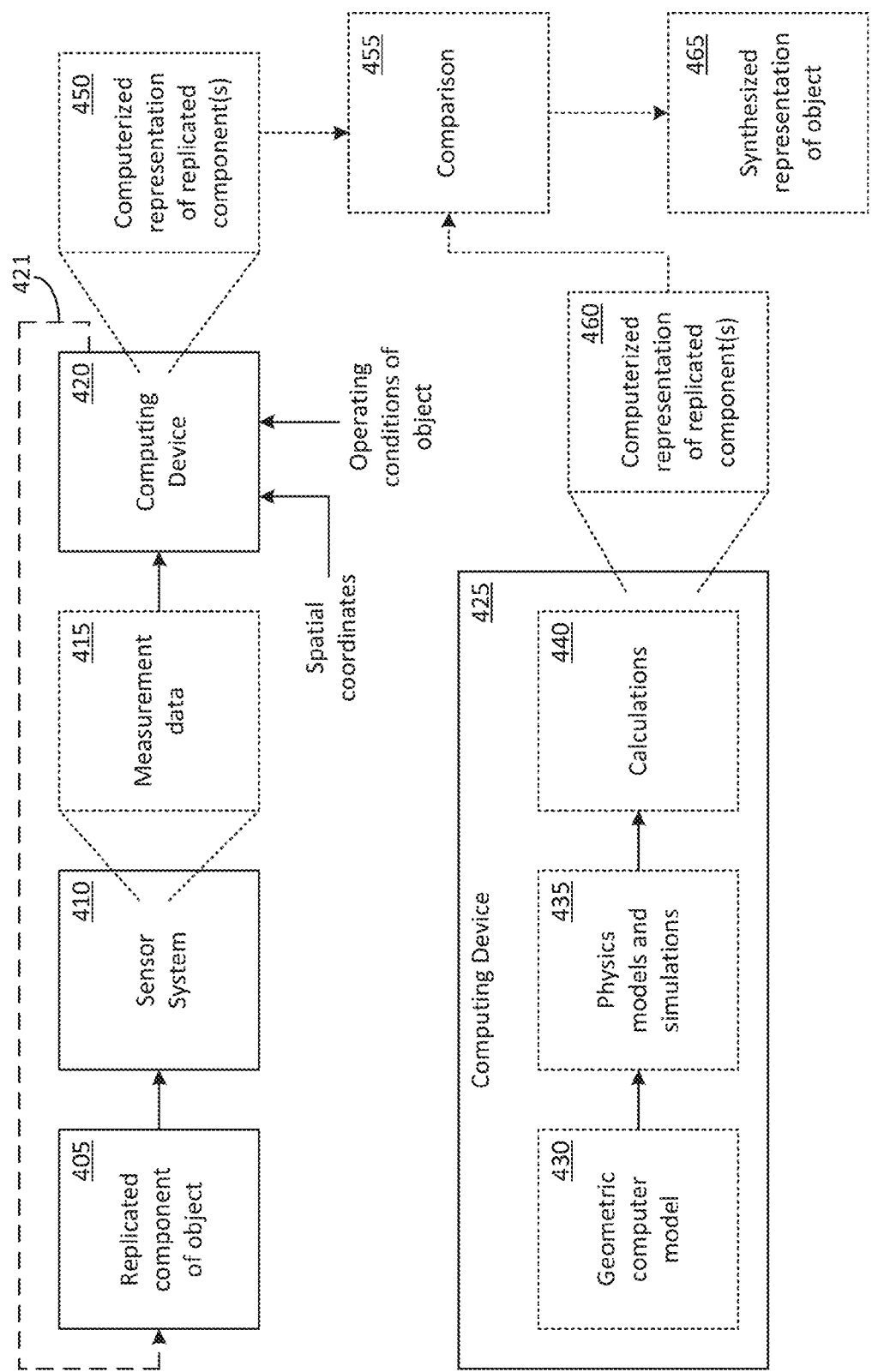

FIG. 4 illustrates example functional blocks pertaining to a method of automated analytics according to an embodiment of the disclosure.

Figure 5:
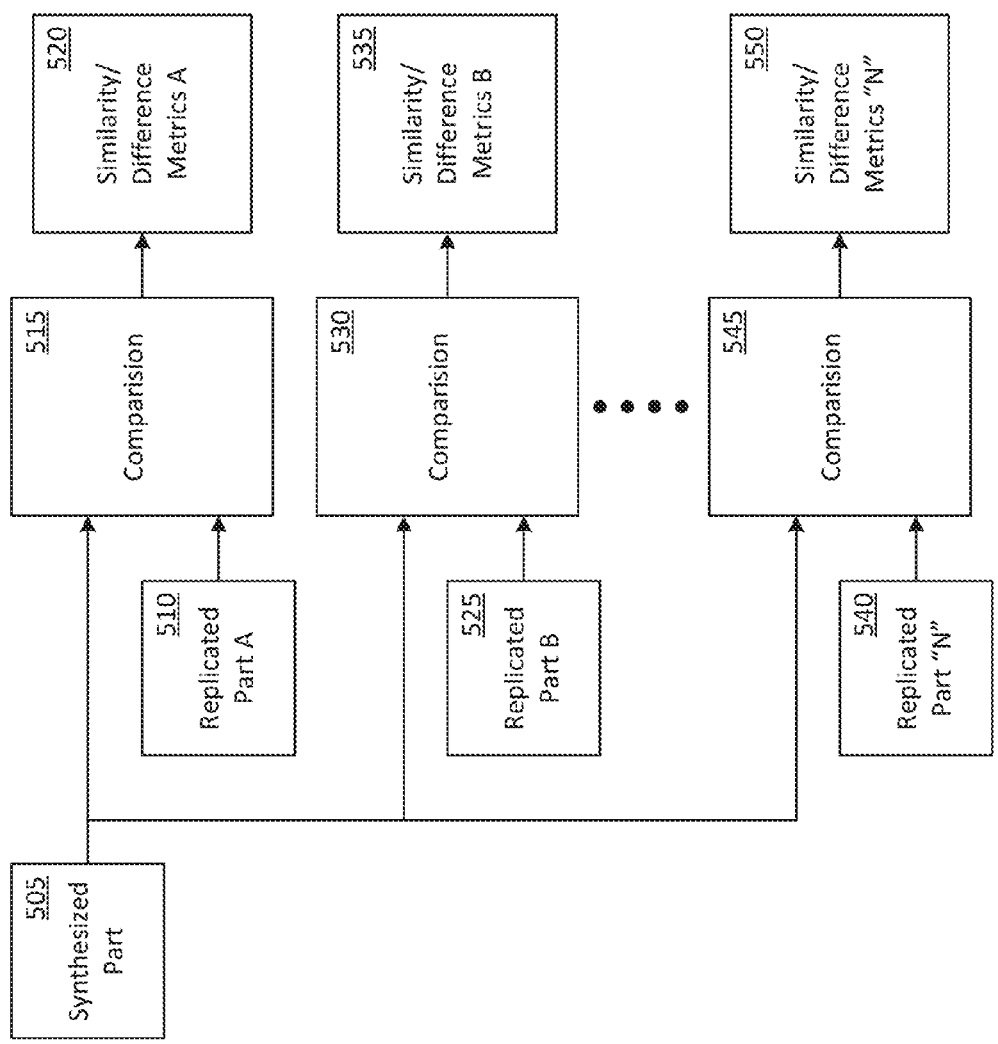

FIG. 5 illustrates some example functional blocks pertaining to another method of automated analytics according to an embodiment of the disclosure.

Figure 6:
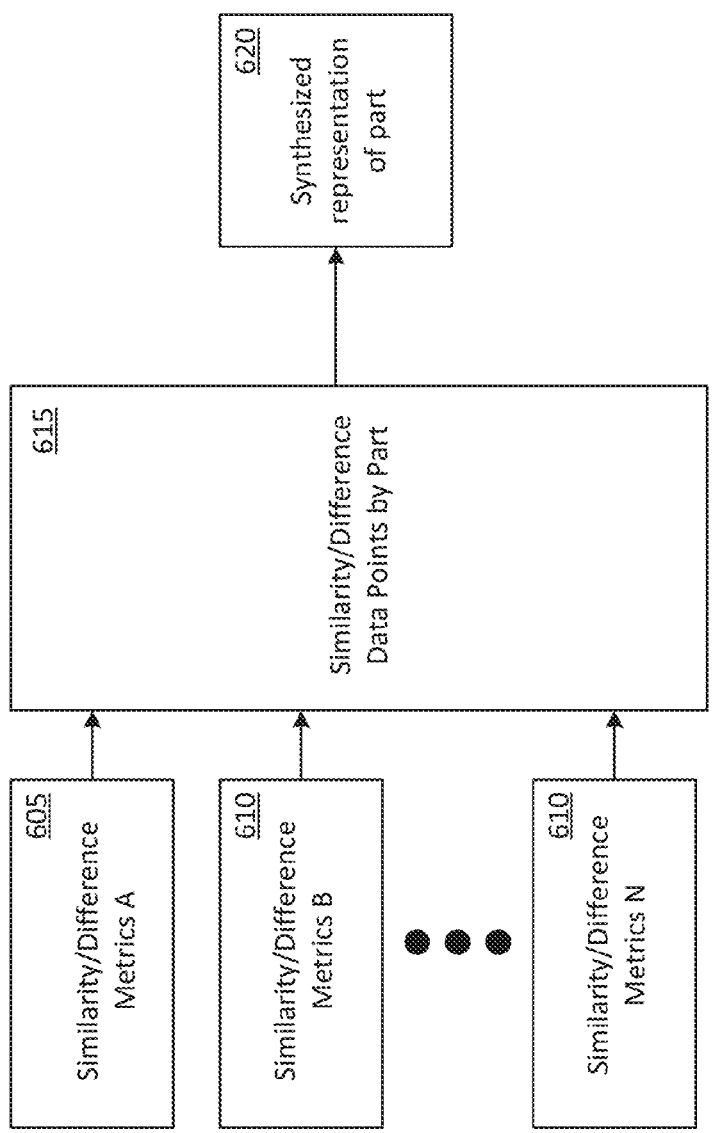

FIG. 6 illustrates some example functional blocks pertaining to yet another method of automated analytics according to an embodiment of the disclosure.

Figure 7:
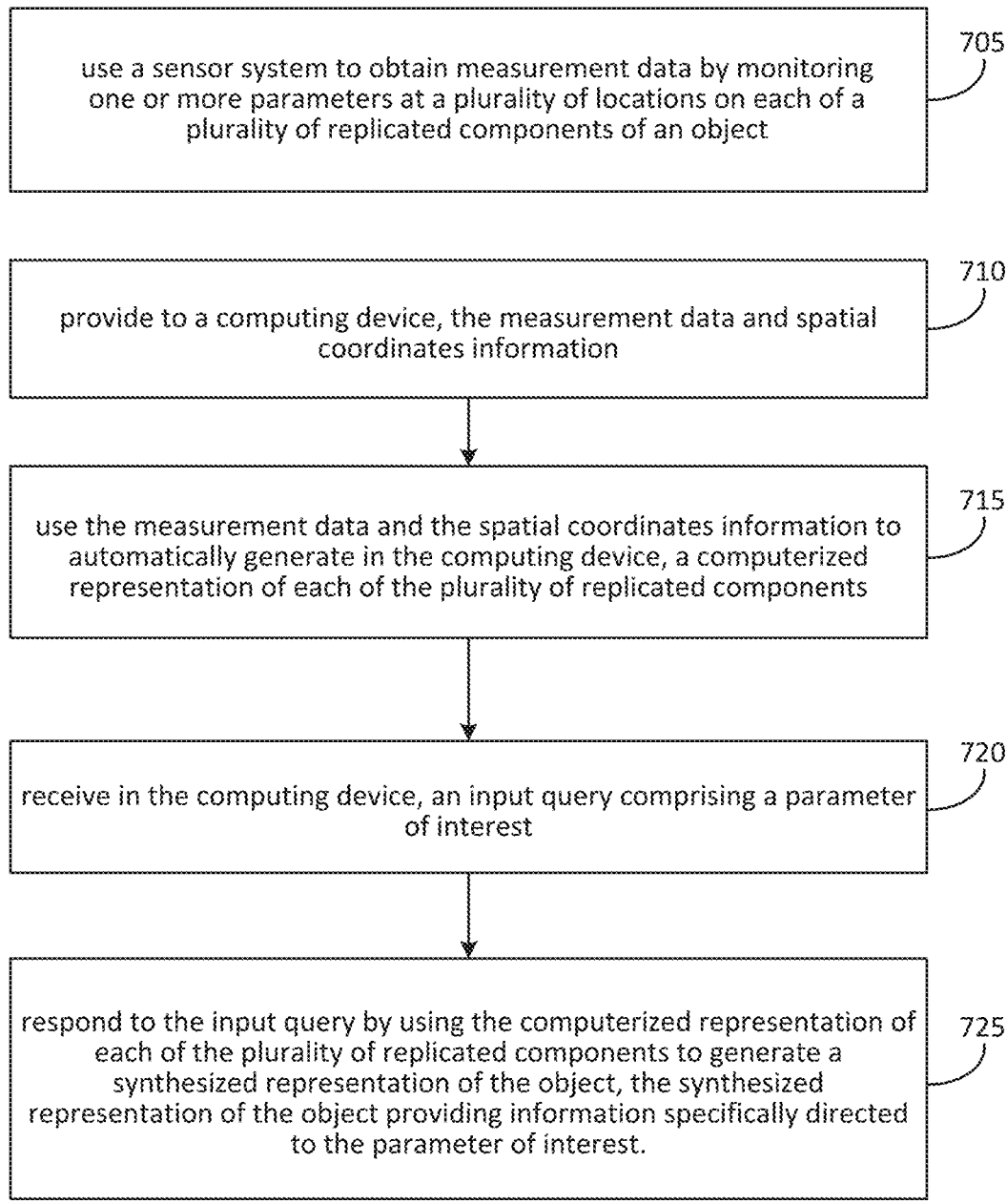

FIG. 7 illustrates a flow chart pertaining to a method of automated analytics according to an embodiment of the disclosure.

Figure 8:
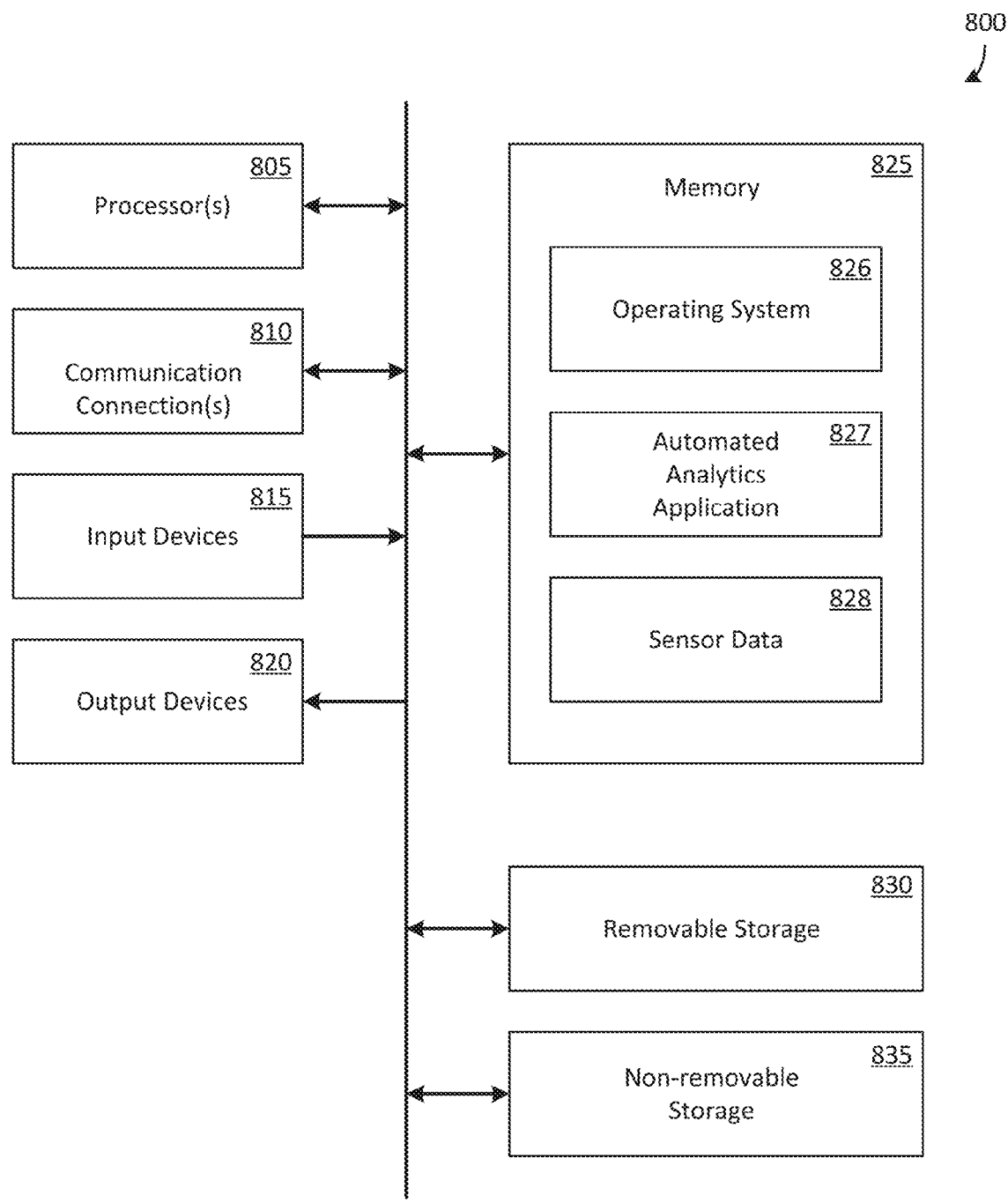

FIG. 8 illustrates an example computer incorporating a processor for executing a method of automated analytics according to an embodiment of the disclosure.

Figure 9:
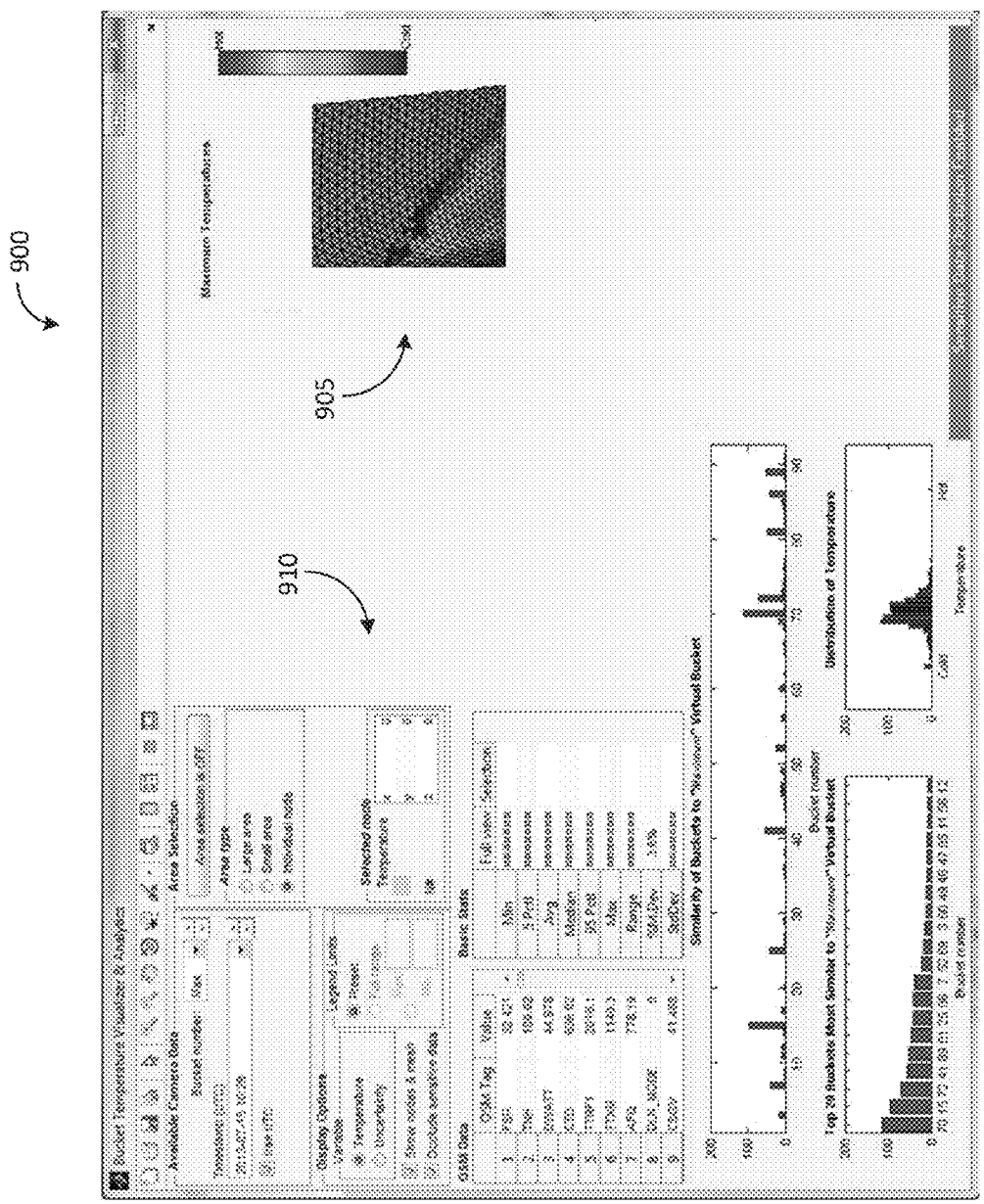

FIG. 9 illustrates an example graphical user interface that can be provided on a display of an automated analytics system according to an embodiment of the disclosure.

DETAILED DESCRIPTION OF THE DISCLOSURE

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will satisfy applicable legal requirements. Like numbers refer to like elements throughout.

Various words, terms and phrases are used herein for convenience of description, and as such these various words, terms and phrases should not be interpreted in a literal sense, but should instead be interpreted broadly by understanding the context in which the various example embodiments have been described. For example, the phrase "dynamic parameters" that is used herein can generally refer to values that change over time. In certain embodiments, these changing values can be a result of motion in an object. The word "motion" is not limited to a rotary motion that is used herein for describing some exemplary embodiments, but instead includes a wide range of motions, such as, for example, a reciprocating motion, a vibrating motion, a periodic motion, a random motion, etc. As another example, the word "actual" that is used herein can generally refer to real-world parts and actions (in contrast to synthesized parts that may be generated and manipulated in a computer).

As yet another example, the word "replicated" should be understood to indicate multiple components that are substantially similar in structure and/or appearance to each other, but may or may not be exactly identical to each other in terms of various properties and behaviors. This aspect may be better understood by using the four tires of an automobile as an example. The four tires constitute "replicated components" to the extent that each of the four tires are substantially similar replicas of each other in terms of their overall appearance, manufacture, and expected level of performance. However, it can be understood that the properties and behaviors of these four tires may be different from one another due to various characteristics that are unique to each of the four tires. For example, a first tire on a car may have an inadequate tread depth that prevents the first tire from providing adequate traction, a second tire may have a weak sidewall that makes the second tire more susceptible to a blowout, a third tire may have a deformity that makes the third tire wobble, and a fourth tire may have a subtle manufacturing defect that may manifest itself as a problem at a later date. On the other hand, the first and the second tire of a different car may be so similar to each other that each of these two tires provides the same level of performance while one or both of the remaining two tires may have defects that cause these other two tires to suffer from certain deficiencies.

FIG. 1 illustrates an example functional block diagram representing an automated analytics system 100 that can be used to analyze an object 130 containing "n" replicated components (n≥2). The "n" replicated components are shown in FIG. 1 as replicated component 135a, replicated component 135b, and so on, to replicated component 135n. The object 130 represents any of a wide variety of objects. For example, in one example implementation, the object 130 can be a turbine assembly and each of the replicated components may be a blade in the turbine assembly. It should be understood that the word "blade" as used herein is used merely for convenience and is indicative of a turbine component that may be alternatively referred to as a "rotor" or a "bucket" or other such similar words as is known in the art.

The object 130 may also include one or more non-replicated components such as non-replicated component 140a and non-replicated component 140b. In the case of the turbine assembly example, the non-replicated component 140a may be an engine housing or a cowling, and the non-replicated component 140b may be an exhaust vent.

A sensor system 120 may be coupled to the object 130 for purposes of obtaining measurement data during monitoring of one or more dynamic parameters of the various components of the object 130. In accordance with the disclosure, the sensor system 120 may be used to monitor one or more dynamic parameters associated with each of the replicated components. The sensor system 120 may be selected in accordance with the nature of the one or more dynamic parameters to be monitored. For example, when temperature is the dynamic parameter of interest, the sensor system 120 may include various temperature sensing elements such as thermocouples or infrared sensors. Some more details of the sensor system 120 are provided below with reference to an example embodiment shown in FIG. 2.

The computing device 145, which is communicatively coupled to the sensor system 120 via communication link 122 for receiving measurement data, may be also used to receive a query from a user (not shown). The query may be directed to one or more aspects pertaining to one or more of the replicated components. For example, the user may desire to know if the replicated component 135a is different from the replicated component 135b in terms of temperature parameters when the object 130 is subjected to a specific operating mode.

Using the turbine assembly example, the user may desire to know if a first blade of the turbine assembly becomes hotter than a second blade when the turbine assembly is operated in a specific manner. The user may further desire to know which area of the first blade constitutes a hotspot if the first blade were to become hotter than the second blade.

In response to the query, the computing device 145 can obtain dynamic measurement data from the sensor system 120 and/or from other elements and use the dynamic measurement data to generate a computerized representation of each of the two blades of the turbine assembly. The computerized representation of the two turbine blades may then be further used by the computing device 145 to generate a synthesized representation 150 of the entire turbine assembly, more particularly a synthesized representation of the turbine assembly when operating in the specific manner indicated in the input query. The synthesized representation of the turbine assembly may provide information that may indicate that the first blade is running hotter than the second blade and that there is a hotspot close to a leading edge of the first blade when the turbine assembly is operating in the specific manner indicated in the input query.

It will be pertinent to point out that the measurement data and spatial coordinates information portion that is provided by the sensor system 120 to the computing device 145 is quantitatively too large for direct processing by a human being without the use of a computer. This aspect will now be addressed in further detail using FIGS. 2A and 2B.

FIGS. 2A and 2B illustrate an example automated analytics system in which the sensor system 120 is coupled to an object in accordance with one embodiment of the disclosure. More particularly, FIG. 2A shows a front view of the object (which is in this example embodiment, a turbine assembly 205), and FIG. 2B shows a side view of the turbine assembly 205 coupled to the sensor system 120.

The turbine assembly 205 includes at least one non-replicated component in the form of an engine housing 207, and also includes a number of replicated components in the form of a set of blades 206 (indicated as 206a, 206b, 206c etc.).

When placed in a first operating mode, the turbine assembly 205 rotates (in real-time and in the real-world) at a certain speed in a clockwise direction—as indicated by the arrow 208. The speed may be set by an operator (not shown) to a predetermined number of rotations per minute (rpm).

In this example embodiment, the turbine assembly 205 has "m" blades that rotate at "r" rpm during the first operating mode. Let it be further assumed that the dynamic parameter of interest is the temperature of one or more of the "m" blades when the turbine assembly 205 is rotating at "r" rpm. Consequently, the sensor system 120 is selected to be a temperature sensing system, such as, for example, an infrared camera.

Such an infrared camera can include a set of "n" sensing elements 211 (indicated as 211a, 211b . . . 211n) that are oriented to capture temperature values from a number of locations on each blade of the set of blades 206 of the turbine assembly 205 that is in rotation. At a first instance in time, the blade 206a is aligned with the set of "n" sensing elements 211 thereby permitting the set of "n" sensing elements 211 to monitor and capture temperature parameters of the blade 206a.

At a second instance in time, as the blades rotate clockwise, the blade 206a moves out of the way and the blade 206b is now aligned with the set of "n" sensing elements 211 thereby permitting the set of "n" sensing elements 211 to monitor and capture temperature parameters of the blade 206b. At a third instance in time, the blade 206b moves out of the way and the blade 206c is now aligned with the set of "n" sensing elements 211 thereby permitting the set of "n" sensing elements 211 to monitor and capture temperature parameters of the blade 206c. This process is repeated as each of the "m" blades continuously moves into a monitoring position that is aligned with the set of "n" sensing elements 211.

As can be understood, the set of "n" sensing elements 211 captures "n" temperature values for each of the "m" blades that are rotating at "r" rpm, which translates to a data capture rate of "m×r×n" temperature readings per minute.

Generally "n" is a large number (a multiple of $10^6$ in some implementations) that can correspond to the number of pixels in an infrared camera having a desirable level of resolution (for example, several megapixels), and "r" for a turbine assembly can be a large number as well (a multiple of $10^3$ in some implementations). Consequently, it can be understood that the data capture rate ("m×r×n" per minute) can be too high for a human being to process in real time and it therefore becomes necessary to use a computer for performing automated analytics in accordance with the disclosure.

While the embodiment shown in FIG. 2B has been described above with reference to a temperature-related application, in other applications, other dynamic parameters, such as, for example, mechanical parameters (such as stress, shear, compression, expansion, etc.), electrical parameters (current, voltage, power, etc.), electro-mechanical parameters (power generating components for example), chemical parameters (chemical composition, chemical changes etc), and/or material parameters (rust, fractures, holes, etc.) may be monitored and analyzed using a correspondingly suitable sensor system 120 having appropriate sensing elements (mechanical, electrical, electro-mechanical, chemical, optical, photovoltaic, audio, and/or material sensing elements).

FIG. 3 illustrates an example procedure for generating a synthesized representation 305 of the turbine assembly 205 (shown in FIG. 2A) in accordance with one embodiment of the disclosure. Referring back to FIGS. 1, 2A and 2B, the sensor system 120 monitors and/or measures one or more dynamic parameters of the turbine assembly 205 and provides this measurement data to the computing device 145. In this example embodiment, the sensor system 120 monitors the set of blades 206 using the set of "n" sensing elements 211 and not only provides the measurement data (for example, the measured temperature data for each of the set of blades 206) to the computing device 145 but also provides to the computing device 145, spatial coordinates information pertaining to the set of sensing elements 211.

As can be understood, the spatial coordinates information pertaining to the set of "n" sensing elements 211 can be provided to the computing device 145 directly from the sensor system 120 or indirectly using other elements (not shown) such as another computer. The spatial coordinates information pertaining to the set of "n" sensing elements 211 may include three-dimensional (3D) or two-dimensional (2D) coordinates information of each sensing element in the set of "n" sensing elements 211. Furthermore, the spatial coordinates information provided to the computing device 145 can not only pertain to the set of "n" sensing elements 211 but may also include additional spatial coordinates information pertaining to the set of blades 206 and/or the turbine assembly 205. For example, the additional spatial coordinates information may pertain to dimensional information, material characteristics information, assembly information, structural information, shape information, etc., of one or more blades of the set of blades 206.

The computing device 145 uses the measurement data and the spatial coordinates information to generate a computerized representation 306 of one or more blades of the set of blades 206, which constitutes example replicated components that are parts of an object being analyzed in accordance with the disclosure. In the example embodiment shown in FIG. 3, computerized representations 306a through 306m of all "m" actual blades of the set of blades 206 of the turbine assembly 205 are generated. Each of the computerized representations 306 can be a three-dimensional (3D) rendering of each actual blade of the set of blades 206.

Further details pertaining to this aspect will now be described using computerized representation 306a as an example element. As indicated by the dashed lines, the computerized representation 306a is a 3D rendering of the blade 206a. In some example embodiments, the computerized representation 306a can be provided as a gray-scale image while in other example embodiments, the computerized representation 306a can be provided as a color image. For example, when the computerized representation 306a is directed at providing temperature information, a color image can be rendered using a spectrum of heat related colors, with shades of red indicating higher temperatures and shades of blue indicating relatively cooler temperatures.

Each point on the surface of computerized representation 306a represents a combination of spatial coordinates information and measurement data. Thus, for example, the point 406a can be a graphical representation of a specific location on the actual blade 206a coupled with temperature data for that location. Similarly, the point 406b is a graphical representation of another specific location on the actual blade 206a and represents the temperature data for this other specific location. As can be understood, the point 406a is located close to a trailing edge of the blade 206a when the turbine assembly 205 is rotating clockwise and may therefore be cooler than another point 406b that is located closer to the center of the blade 206a. Consequently, the point 406a may be rendered in a dark shade of blue while the point 406b may be rendered in a dark shade of red to provide a visual representation of point 406b being hotter than point 406a.

The computing device 145 may also use the computerized representation 306 of the actual set of blades 206 of the turbine assembly 205 to generate a synthesized representation 305 of the actual turbine assembly 205. The spatial coordinates information and the measurement data embedded in the computerized representations 306a through 306m are transferred to the synthesized representation 305 thereby providing a technical effect and/or solution of visual representation of various anomalies, difference characteristics, or similarities characteristics that may be present in various blades of the set of blades 206 of the turbine assembly 205 when the turbine assembly 205 is in operation as described above with respect to FIGS. 2A and 2B.

A cumulative set of points may result in certain areas of the blades 306 being rendered as areas having certain characteristics that are different from other areas. For example, the area 311 may be red in color while the surrounding areas are blue in color, thereby providing a visual indication that area 311 is a hotspot on the blade 306a. A wavy line 312 that may be darker than surrounding areas in a gray scale synthesized representation 305 may be indicative of a hairline crack in the blade 306c. Other such visual indicators provide a variety of automated analytics results when the turbine assembly 205 is subjected to various operating modes in accordance with the disclosure.

FIG. 4 illustrates example functional blocks pertaining to a method of automated analytics according to an embodiment of the disclosure. Block 405 represents a replicated component, such as the replicated component 135a of the object 130 shown in FIG. 1. The sensor system 410 is applied to the replicated component 405 (such as described above with reference to FIG. 2B), and the measurement data 415 is provided to the computing device 420. The computing device 420 is also provided with spatial coordinates information and/or operating modes information. The computing device 420 uses the provided inputs to generate a computerized representation 450 of a replicated component, and may then repeat the procedure (as indicated by dashed line 421) to generate additional computerized representations of additional replicated components of the object 130.

A computing device 425 (which can be the same computing device as the computing device 420, in certain embodiments) may be used to execute a simulation procedure for generating a synthesized representation of a replicated component. In this simulation procedure, the computing device 425 uses one or more of a geometric computer model 430, a physics models and simulations 435, and calculations 440 to generate a computerized representation 460 of one or more replicated components of the object 130. The computerized representation 460 (which constitutes a theoretical representation of one or more replicated components of the object 130 derived from a theoretical computer model) is subjected to a comparison 455 with the computerized representation 450 (which constitutes a real-world representation of one or more replicated components contained in a real-world object 130).

The comparison 455 may be carried out in a variety of ways, such as, for example, by executing an AND functionality and/or an OR functionality. The comparison may be also carried out by using specific features or mathematical and/or statistical metrics of interest. For example, data sets across various parts of the object may be combined using only maximum values of a physical variable (temperature, for example) for each specific spatial location, and/or by combining data sets across various operating loads in order to find average physical values (stresses, for example) at specific locations in various parts of the object.

The result of comparison 455 may be used to generate a synthesized representation 465 of the object 130. The synthesized representation 465 may be used for comparing against the object 130, by incorporating mathematical and/or statistical metrics in order to identify similarity metrics and/or difference metrics. This procedure may be implemented by using for example, an average of localized differences between the synthesized representation 465 and one or more of the replicated parts in the object 130, and/or the similarities/differences in extreme values between the synthesized representation 465 and one or more of the replicated parts in the object 130, for example.

Similarity/difference metrics derived from comparing the synthesized representation 465 with the actual object, may be rendered in a graphical user interface on a display in a variety of formats, such as, for example, using color gradients on the synthesized representation 465, histograms to represent various degrees of similarities/differences between the synthesized representation 465 and the actual object, multi-dimensional charts to compare extremes by region or location, and by loading/operating regime changes on the synthesized representation 465 and/or the actual object. The observed similarity/difference metrics may be used to make decisions such as engineering choices, maintenance operations, design changes, and/or usage of the object.

In contrast to the method illustrated in FIG. 4, which pertains to generating a synthesized representation 465 of an entire object, FIG. 5 illustrates an example method of automated analytics that may be applied to individual replicated components according to another embodiment of the disclosure. In this example, a computing device (not shown) may be used to generate one or more synthesized parts. One of these synthesized parts may be selected based on one or more criterion, such as for example, a part that is deemed to be a "good" part or a "bad" part. The selected part is illustrated in FIG. 5, as a synthesized part 505. The synthesized part 505 may be generated by the computing device using one or more theoretical parameters (such as, for example, the geometric computer model 430, the physics models and simulations 435, and the calculations 440 illustrated in FIG. 4).

The synthesized part 505 may be used to perform automated analytics on "N" number of actual parts (N≥1). For example, the "N" actual parts may be 92 blades of a turbine assembly that have been manufactured in one or more manufacturing facilities based on specifications provided by a customer. As a result of variations in the manufacturing lines and processes, the customer may receive parts that appear to be superficially identical to each other but may include some parts that perform differently than other parts when these parts are assembled onto a turbine assembly, and the turbine assembly is subjected to various operating modes. These differences may not be readily identifiable by conventional examination procedures, such as, for example, a quality assurance procedure that merely checks for dimensional tolerances on each of the parts. Consequently, it is desirable to perform an automated analytics procedure in accordance with the disclosure so as to identify the differences between two or more parts when the turbine assembly is subjected to one or more operating modes.

Accordingly, a computing device (such as the computing device 145 shown in FIG. 1) may be used to perform a first comparison 515 between the synthesized part 505 and a replicated part A 510. The results of the comparison provide an indication of the similarities or differences between various metrics of the synthesized part 505 and the replicated part A 510. The results are indicated in FIG. 5 as similarity/difference metrics A 520.

The computing device may be also used to perform a second comparison 530 between the synthesized part 505 and a replicated part B 525. The results of the comparison provide an indication of the similarities or differences between various metrics of the synthesized part 505 and the replicated part B 525. The results of this second comparison are indicated in FIG. 5 as similarity/difference metrics B 535.

This procedure is executed "N" number of times in order to obtain similarity/difference metrics for each of the replicated parts "N" 540 and the results compared (comparison 545) to identify two or more replicated parts that are different from one another and/or two or more replicated parts that are similar to one another (similarity/difference metrics N 550).

FIG. 6 illustrates some example functional blocks pertaining to yet another method of automated analytics according to an embodiment of the disclosure. In this embodiment, the similarity/difference metrics (for example, similarity/difference metrics 520, 535 and 550 of FIG. 5) can be configured as a database. The database may not only provide information pertaining to one or more metrics but may also include time values associated with each of the metrics. In one example, an Excel spreadsheet type of database may be used to indicate the various metrics measured at various times (the time values may be indicated in rows while the metric values are indicated by columns of the spreadsheet).

The database containing the various metrics may be used by the computing device to identify similarities and/or differences between various data points on a per component basis. The results of this comparison are indicated in FIG. 6 as similarity/difference data points by part 615. Furthermore, the results may be used to generate a synthesized representation of one or more parts and/or the entire object. When the synthesized representation is a color graphic, the color graphic can be used to visually identify various anomalies (such as hotspots, defects, etc.) and/or similarities between various replicated components.

FIG. 7 illustrates a flow chart pertaining to a method of automated analytics according to an embodiment of the disclosure. In block 705, a sensor system may be used to obtain measurement data by monitoring one or more parameters at a plurality of locations on each of a plurality of replicated components of an object. In block 710, a computing device may be provided with the measurement data and spatial coordinates information. In block 715, the measurement data and the spatial coordinates information may be used by the computing device to automatically generate a computerized representation of each of the plurality of replicated components. In block 720 an input query comprising a first parameter of interest is received in the computing device.

For example, the input query may pertain to identifying a hotspot in one or more replicated components such as one or more turbine blades of a turbine assembly when the turbine assembly is operated at a given speed under a given operating mode. As another example, the input query may pertain to identifying anomalies or similarities between two or more of a number of replicated components, when the replicated components are operating in a certain operating mode (speed, temperature, stress, etc.).

The computing device may respond to the input query (block 725) by using the computerized representation of each of the plurality of replicated components to generate a synthesized representation of the turbine assembly, where the synthesized representation of the turbine assembly provides information specifically directed to anomalies, differences, or similarities in various replicated components.

Another query may be provided to the computing device at a different time, in order to identify another parameter of interest, for example, a manufacturing defect (such as an imperfectly coated surface). In response to this other query, the computing device may use the computerized representation of each of the plurality of replicated components to generate another synthesized representation of the turbine assembly, where this other synthesized representation provides information specifically directed to one or more imperfections on the coated surfaces of one or more replicated components.

Yet another query may be directed to finding correlations and dependencies of the measured physical variables (such as the sensor data) across various locations and operating conditions of a system containing replicated parts. This information may be used to identify various trends and/or existing/predicted operating behaviors associated with one or more of the replicated parts.

FIG. 8 illustrates an example computer 800 for executing a method of automated analytics according to an embodiment of the disclosure.

Computer 800 may include a processor 805 capable of communicating with a memory 825. The processor 805 may be implemented and operated using appropriate hardware, software, firmware, or combinations thereof. Software or firmware implementations may include computer-executable or machine-executable instructions written in any suitable programming language to perform the various functions described. In one embodiment, instructions associated with a function block language may be stored in the memory 825 and executed by the processor 805.

A memory 825 may be used to store program instructions that are loadable and executable by the processor 805, as well as to store data related to the execution of these programs. Depending on the configuration and type of computer 800, the memory 825 may be volatile (such as random access memory (RAM)) and/or non-volatile (such as read-only memory (ROM), flash memory, etc.). In some embodiments, the memory devices may also include additional removable storage 830 and/or non-removable storage 835 including, but not limited to, magnetic storage, optical disks, and/or tape storage. The disk drives and their associated computer-readable media may provide non-volatile storage of computer-readable instructions, data structures, program modules, and other data for the devices. In some implementations, memory 825 may include multiple different types of memory, such as static random access memory (SRAM), dynamic random access memory (DRAM), or ROM.

The memory 825, the removable storage 830, and the non-removable storage 835 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Computer 800 may also include one or more communication connections 810 that may allow a control device (not shown) to communicate with devices or equipment capable of communicating with the computer 800. The connections can be established via various data communication channels or ports, such as USB or COM ports, to receive cables connecting the control device to various other devices on a network. In one embodiment, the control device may include Ethernet drivers that enable the control device to communicate with other devices on the network. According to various embodiments, communication connections 810 may be established via a wired and/or wireless connection on the network.

The computer 800 may also include an input interface in the form of one or more input devices 815, such as a keyboard, mouse, pen, voice input device, and touch input device. It may further include one or more output devices 820, such as a display, printer, and speakers. The display can be used to display a synthesized representation of an object in a visual format that is interpretable by a human being to derive information associated with one or more parameters of interest in accordance with the disclosure.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

Turning to the contents of the memory 825, the memory 825 may include, but is not limited to, an operating system (OS) 826 and one or more application programs or services for implementing the features and aspects disclosed herein. Such applications may include an automated analytics application 827, which may be implemented by software that is provided in configurable control block language and is stored in the non-volatile memory. When executed by the processor 805, the automated analytics application 827 implements the various functionalities and features described in this disclosure. Towards this end, the automated analytics application 827 may use data such as the sensor data 828 that is stored in the memory 825. Such data may not only be stored in the memory 825 but also can be stored in other elements including one or more databases (not shown).

FIG. 9 illustrates an example graphical user interface 900 of an automated analytics system according to an embodiment of the disclosure. The graphical user interface 900 may include a 3D rendering of a replicated component such as a turbine blade 905. Though shown in FIG. 9 as a gray-scale image, it can be understood that the 3D rendering of the turbine blade 905 may be provided as a color image with the various colors indicating various values for various parameters. For example, various shades of red may be used to indicate various high temperature values, various shades of blue may be used to indicate various relatively lower temperature values, and various shades of orange and/or yellow to indicate intermediate temperature values.

The graphical user interface 900 also includes a display area 910 that permits a user to enter various types of queries and observe the resulting responses (numerical values, graphs, etc). Some examples of the types of queries may include queries pertaining to localized behaviors and trends, queries pertaining to identifying outlier parts, queries pertaining to sorting or classifying parts based on various parameters, queries pertaining to variances by part, part area and/or conditions, queries pertaining to localized degradation, queries pertaining to prognostics, queries pertaining to correlations and dependencies of physical variables across locations and operating modes, queries pertaining to patterns and/or trends for different physical variables by geometry and/or operating modes, and queries pertaining to a simplified overall assessment for complex geometry and/or a large number of parts.

In summary, the disclosure is generally directed to a coherent approach that processes data sets according to spatial locations and operating conditions (loads, regimes, etc.). In contrast to a traditional approach where data may be classified in accordance with various characteristics, the automatic analytics systems and methods disclosed herein constitute a targeted approach where certain types of data are processed with deliberate attention and interpretation of the spatial geometry of an object. Hence, data measurement points are described not merely in the form of simple value points or generally as records or "rows" of data, but rather as physical variables with "inherent" locations and operating conditions. This approach allows for selection of specific subsets of data points from large data sets, and for many different parts/conditions in order to perform specific analytic/statistical/mathematical calculations on these subsets. Results thus become highly coherent and retain the "inherent" locational or operational characteristics of the source data sets, and hence, their geometric/operational shapes and patterns.

In terms of combining spatial characteristics with operational characteristics, the synthesized representation disclosed in this disclosure can provide "generalized" or "unified" results into a single data set that describes characteristics of multiple data sets in a new, single, summary data set that resembles the data sets of the original parts but contains new information that enables one to make comparisons easily and with good understanding of physical patterns, trends, behaviors or phenomena. The synthesized representation not only offers a summary or distilment of a multiplicity of data sets, but also provides for a visual rendering in an appealing and readily-discernable manner.

It may be also pertinent to point out that comparison based analysis provides certain advantages over traditional approaches wherein data sets are classified merely on the basis of statistics or other analytics techniques (clustering, classification, machine learning, etc.) without incorporating spatial information.

References are made herein to block diagrams of systems, methods, apparatuses, and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based, or programmable consumer electronics, mini-computers, mainframe computers, etc.

Application programs that are components of the systems and methods described herein may include routines, programs, components, data structures, etc., that implement certain abstract data types and perform certain tasks or actions. In a distributed computing environment, the application program (in whole or in part) may be located in local memory or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An automated analytics method comprising:
   using a sensor system to obtain measurement data by monitoring one or more parameters at a plurality of locations on each of a plurality of replicated components of an object;
   providing to a computing device, the measurement data;
   using the measurement data to automatically generate in the computing device, a first computerized representation of at least one of the plurality of replicated components;
   generating, based on a geometric computer model, a second computerized representation of the at least one of the plurality of replicated components;
   receiving in the computing device, a first input query comprising a first parameter of interest; and
   responding to the first input query by comparing the first computerized representation to the second computerized representation and generating a first synthesized representation of at least a portion of the object, the first synthesized representation providing information specifically directed to the first parameter of interest.

2. The method of claim 1, wherein the one or more parameters comprise dynamic parameters that are generated when the object is in at least one of a first operating mode or a second operating mode.

3. The method of claim 1, wherein the first parameter of interest is at least one of a temperature parameter, a chemical parameter, a failure mode parameter, a stress mode parameter, or a strain mode parameter, and wherein the first parameter of interest is associated with at least one of: a) the at least one of the plurality of replicated components or b) an entirety of one or more of the plurality of replicated components.

4. The method of claim 1, further comprising:
   determining from the first synthesized representation of the object, at least one of a similarity between two or more of the plurality of replicated components with respect to the first parameter of interest, or a difference between two or more components of the plurality of replicated components with respect to the first parameter of interest.

5. The method of claim 1, wherein the measurement data comprises individual measurements executed at individual locations of the plurality of locations, and wherein using the measurement data to automatically generate the first computerized representation of the at least one of the plurality of replicated components comprises a 3-D mapping of the individual measurements.

6. The method of claim 1, further comprising:
   receiving in the computing device, a second input query comprising a second parameter of interest; and
   responding to the second input query by using the first computerized representation of the at least one of the plurality of replicated components to generate a second synthesized representation of the at least a portion of the object, the second synthesized representation of the at least a portion of the object providing information specifically directed to the second parameter of interest.

7. The method of claim 1, wherein the sensor system comprise infra-red sensor elements, and the measurement data comprises temperature measurements.

8. The method of claim 1, wherein using the measurement data to automatically generate the first computerized representation comprises combining the measurement data obtained from the sensor system with spatial coordinates information of a plurality of sensors of the sensor system.

9. The method of claim 1, further comprising:
   determining from the first synthesized representation of the object, a temperature difference between two or more of the plurality of replicated components.

10. An automated analytics system comprising:
a sensor system configured to obtain measurement data by monitoring one or more parameters at a plurality of locations on each of a plurality of replicated components of an object;
a computing device comprising:
an input interface configured to:
receive the measurement data obtained by the sensor system; and
receive a first input query comprising a first parameter of interest;
a processor configured to:
use the measurement data to automatically generate a first computerized representation of at least one of the plurality of replicated components;
generate a second computerized representation of the at least one of the plurality of replicated components based on a geometric computer model;
respond to the first input query by comparing the first computerized representation to the second computerized representation and generate a first synthesized representation of at least a portion of the object based on the first parameter of interest; and
a display configured to display the first synthesized representation of the at least a portion of the object in a visual format that is interpretable by a human being to derive information associated with the first parameter of interest.

11. The system of claim 10, wherein the one or more parameters comprise dynamic parameters, and wherein the sensor system is configured to obtain the dynamic parameters when the object is in at least one of a first operating mode or a second operating mode.

12. The system of claim 10, wherein the sensor system comprises at least one of a plurality of temperature sensors, a plurality of strain gauges, a plurality of infra-red sensors, a plurality of thermocouples, a plurality of chemical sensors, a plurality of optical sensors, a plurality of photo sensors, or a plurality of audio sensors.

13. The system of claim 10, wherein the input interface is further configured to receive a second input query comprising a second parameter of interest, and the processor is further configured to respond to the second input query by using the first computerized representation of the at least one of the plurality of replicated components to generate a second synthesized representation of the at least a portion of the object based on the second parameter of interest.

14. The system of claim 10, wherein the sensor system comprises a plurality of infra-red sensor elements contained in an infra-red camera, wherein the measurement data comprises temperature measurements provided by each of the infra-red sensors.

15. The system of claim 14, wherein the processor is configured to use the temperature measurements to automatically generate the first computerized representation of the at least one of the plurality of replicated components.

16. The system of claim 10, wherein the object is a turbine assembly and each of the replicated components is a turbine blade.

17. A computer-readable storage medium having stored thereon instructions executable by a computer for performing operations comprising:
using measurement data provided by a sensor system to generate a first computerized representation of at least one of a plurality of replicated components of an object;
using a geometric computer model to generate a second computerized representation of the at least one of the plurality of replicated components; and
responding to a first input query by using the first computerized representation and the second computerized representation to generate a first synthesized representation of at least a portion of the object, the first synthesized representation of the at least a portion of the object providing information specifically directed to a first parameter of interest contained in the first input query.

18. The computer-readable storage medium of claim 17, wherein the first parameter of interest comprises at least one of a temperature parameter, a chemical parameter, a failure mode parameter, a stress mode parameter, or a strain mode parameter, associated with at least a portion of the at least one of the plurality of replicated components.

19. The computer-readable storage medium of claim 17, containing further instructions executable by the computer for performing operations comprising:
using a color scheme to highlight at least one of a similarity between two or more of the plurality of replicated components with respect to the first parameter of interest, or a difference between two or more components of the plurality of replicated components with respect to the first parameter of interest.

20. The computer-readable storage medium of claim 17, wherein using the measurement data to generate the first computerized representation comprises combining the measurement data obtained from the sensor system with spatial coordinates information of a plurality of sensors of the sensor system.

* * * * *